US012704992B2

(12) United States Patent
Kabir et al.

(10) Patent No.: US 12,704,992 B2
(45) Date of Patent: Aug. 11, 2026

(54) MULTIPLE RANK DRAMS ON A SAME MODULE SIDE

(71) Applicant: Micron Technology, Inc., Boise, ID (US)

(72) Inventors: Mohammad Ehsanul Kabir, Boise, ID (US); Timothy Hollis, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 32 days.

(21) Appl. No.: 18/434,445

(22) Filed: Feb. 6, 2024

(65) Prior Publication Data

US 2024/0272823 A1 Aug. 15, 2024

Related U.S. Application Data

(60) Provisional application No. 63/445,925, filed on Feb. 15, 2023.

(51) Int. Cl.
*G06F 3/06* (2006.01)
*G11C 5/02* (2006.01)

(52) U.S. Cl.
CPC .......... *G06F 3/0655* (2013.01); *G06F 3/0604* (2013.01); *G06F 3/0673* (2013.01)

(58) Field of Classification Search
CPC .... G06F 3/0604; G06F 3/0655; G06F 3/0673; G11C 5/02
USPC .......................................................... 711/154
See application file for complete search history.

(56) References Cited

U.S. PATENT DOCUMENTS

2007/0258278 A1* 11/2007 Bacha ...................... G11C 5/04 365/51
2010/0031075 A1* 2/2010 Kapil .................. G06F 11/3062 713/340
2013/0258755 A1* 10/2013 Kollipara .............. G11C 11/401 365/149
2014/0063887 A1 3/2014 Vogelsang
2015/0331817 A1* 11/2015 Han ...................... G06F 3/0611 710/308
2017/0329719 A1* 11/2017 Hampel ............... G11C 7/1075
2020/0218447 A1 7/2020 Chang et al.
2021/0132856 A1 5/2021 Chen
2021/0265308 A1 8/2021 Norman et al.
2023/0112159 A1* 4/2023 Luo ....................... G06F 3/0659 711/154

* cited by examiner

*Primary Examiner* — Hashem Farrokh
(74) *Attorney, Agent, or Firm* — Brooks, Cameron & Huebsch, PLLC

(57) ABSTRACT

An example apparatus can include a dual-rank dual-inline memory module (DIMM) device. The dual-rank DIMM device can include a plurality of dual-rank memory chip sets and each includes a first-ranked memory chip and a second-ranked memory chip. Each of the plurality of dual-rank memory chip sets can be positioned on a same side of the dual-rank DIMM device.

11 Claims, 4 Drawing Sheets

MULTIPLE RANK DRAMS ON A SAME MODULE SIDE

PRIORITY INFORMATION

This Application claims the benefit of U.S. Provisional Application No. 63/445,925, filed on Feb. 15, 2023, the contents of which are incorporated herein by reference.

TECHNICAL FIELD

Embodiments of the disclosure relate generally to memory sub-systems, and more specifically, relate to multiple rank dynamic random access memories (DRAM) on a same module side.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
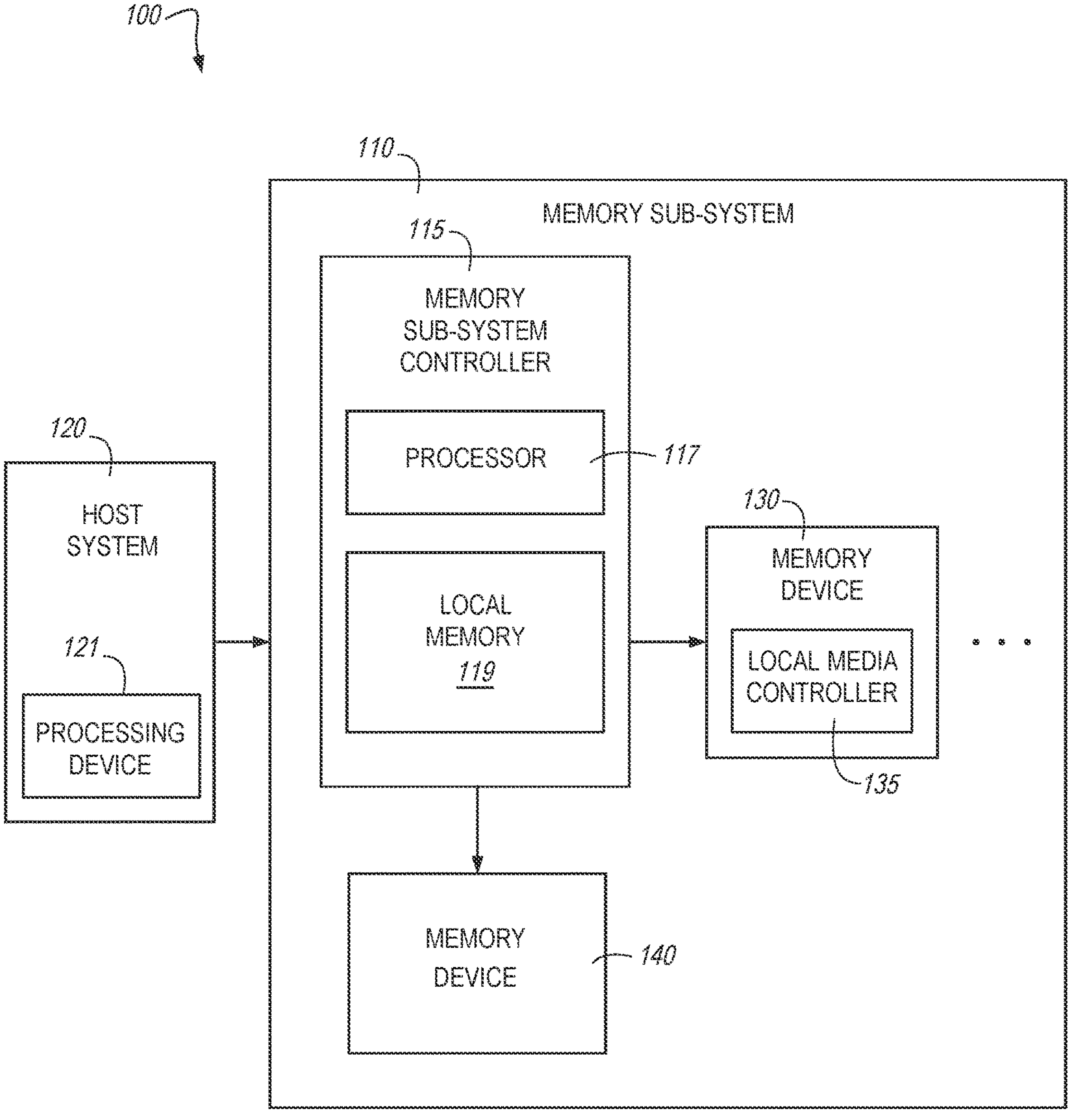
FIG. 1 illustrates an example computing system that includes a memory sub-system in accordance with some embodiments of the present disclosure.

Aspects of the present disclosure are directed to multiple rank dynamic random access memories (DRAMs) on a same module side in a memory sub-system, in particular to memory sub-systems that contain a dual-rank dual-inline memory module (DIMM) that have separate rank DRAMs located on a same side of the module. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states, while a TLC can store multiple bits of information and has eight logic states.

Another example of a memory device can be a volatile memory device. A volatile memory device can include a memory array, which can be a dynamic random access memory (DRAM) array, SRAM array, STT RAM array, PCRAM array, TRAM array, and/or RRAM array, for instance. In general, a volatile memory device stores data while the memory device is powered but generally does not store data when the memory device is powered down or is powered off. A memory sub-system, such as a SSD, can include a combination of non-volatile memory devices and volatile memory devices.

A memory module or printed circuit board (PCB) can include a dual-rank topology referred to as a same-side rank where two DRAMs of separate ranks which are electrically connected by micro-strip traces are placed in a same side (either a top layer side or a bottom layer side) of the memory module or PCB. For a dual rank system (e.g., 2R×4), DRAMs of a same rank can be located toward a first horizontal direction (also referred to as north side) or second horizontal direction (also referred to as south side) of the memory module on the top layer side and the bottom layer side.

In some conventional approaches, the dual-rank topology can include an opposite-side rank where separate ranks are placed in an opposite side (for example, one on a top side, one on a bottom side) of the memory module or PCB. These two DRAMs of separate rank can be electrically connected by via and each same rank DRAM are located on a same side of the memory module or PCB. For example, all the first-ranked DRAMs would be on a top side and the top side DRAMs would be accessed concurrently, simultaneously, coincidentally, and/or synchronously. Further, in this conventional approach, all the second-ranked DRAMs would be on a bottom side and accessed concurrently, simultaneously, coincidentally, and/or synchronously. While the top side DRAMs are being accessed, the bottom side DRAMs would not be accessed and vice versa. While this conventional approach has a smaller stub in a particular direction (for example the z-direction), the via close to the gold-finger of the DRAM has a stub that may be eliminated but the via close to the DRAM has an asymmetric stub and may not be eliminated. This may create crosstalk in both vias.

Aspects of the present disclosure address the above and other deficiencies by using a same side rank topology where separate ranks are placed in a same side (for example, both on a top side or both on a bottom side) of the memory module or PCB. These two DRAMs of separate rank can be electrically connected by micro-via and each same rank DRAM are located on an opposite side of the memory module or PCB. For example, all the first-ranked DRAMs would be on a north portion of each of the top and bottom sides and the north portion of the top and bottom sides would be accessed concurrently, simultaneously, coincidentally, and/or synchronously. Further, in the approach described herein, all the second-ranked DRAMs would be on a south portion of each of the top and bottoms sides and be accessed concurrently, simultaneously, coincidentally, and/or synchronously. While the north portion DRAMs are being accessed, the south portion DRAMs would not be accessed and vice versa.

The approach described herein includes routing the input/output (I/O) package pins in the top layer and adjacent strip-line layer S3 using a micro-via and in the bottom layer and adjacent strip-line layer S10 using another micro-via. The micro-via close to the DRAMs for each of the top and bottom layers can be located between the example north and south portions of DRAMs. Further, a micro-strip trace from the respective micro-via can symmetrically connect the I/O pins of the north portion and south portion of the DRAMs. In this way, the closer the I/O package pins are to the perimeter of the memory module, the better the return loss will be with a shorter stub. The stub between the ranks will be symmetrically controlled. Also, by using micro-via, via lengths will be kept to a minimum, resulting in less crosstalk.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing device 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 can be resident on a mobile computing device such as a smartphone, laptop, phablet, Internet-of-Things device, autonomous vehicle, or the like (e.g., the computing system 100 can be a mobile computing device). As used herein, the term "resident on" refers to something that is physically located on a particular component. For example, the memory sub-system 110 being "resident on" the mobile computing device refers to a condition in which the hardware that comprises the memory sub-system 110 is physically located on the mobile computing device. The term "resident on" may be used interchangeably with other terms such as "deployed on" or "located on," herein. Further, as used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Figure 2A:
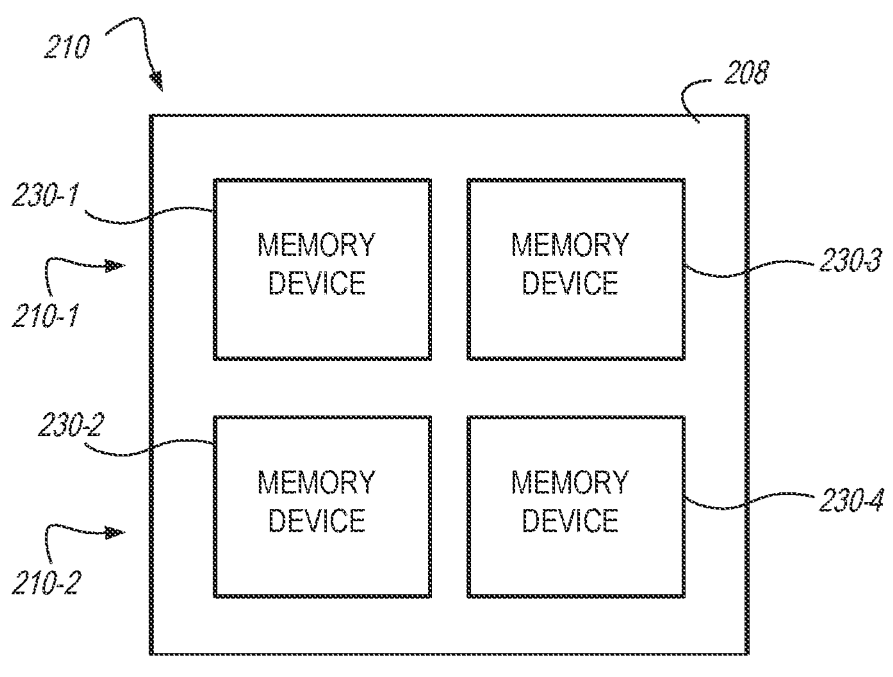
FIG. 2A illustrates an orthogonal top view of an example memory sub-system in accordance with some embodiments of the present disclosure.

FIG. 2A illustrates an orthogonal top side of an example memory sub-system 210 in accordance with some embodiments of the present disclosure. The view of the memory sub-system 210 shown in FIG. 2A illustrates embodiments in which the components of the memory sub-system 210 are oriented on a printed circuit board (PCB) 208 such that a longest lateral dimension of the PCB 208 extends along the x-axis of FIG. 2A, and shortest lateral dimension of the PCB 208 along the y-axis. The z-axis shown in FIG. 2A extends into and out of the illustration. Although embodiments are not so limited, the example memory sub-system 210 illustrated in FIG. 2A and FIG. 2B can be a memory sub-system that has a M.2 form factor.

The example memory sub-system 210 can be referred to in the alternative as a "system" or an "apparatus," herein. As used herein, an "apparatus" or "system" can refer to, but is not limited to, any of a variety of structures or combinations of structures, such as a circuit or circuitry, a die or dice, a module or modules, a device or devices, or a system or systems, for example. For example, the memory sub-system 210 can include one or more memory modules (e.g., dual in-line memory modules, quad in-line memory modules, etc.). In a number of embodiments, the memory sub-system 210 can include a multi-chip device. A multi-chip device can include a number of different memory types and/or memory modules (e.g., the memory device(s) 230 and/or the memory device(s) 240). Accordingly, the memory sub-system 210 can include non-volatile or volatile memory on any type of a module.

As shown in FIG. 2A, the top portion of the memory sub-system 210 includes a plurality of memory devices 230-1, 230-2, 230-3, 230-4 (referred to hereinafter as plurality of memory devices 230). The components of the memory sub-system 210 (e.g., the plurality of memory devices 230) can be resident on a PCB 208. The memory sub-system 210 can be analogous to the memory sub-system 110 illustrated in FIG. 1. Similarly, the memory sub-system 210 can include a controller, such as controller 115 in FIG. 1, herein.

As mentioned above, the plurality of memory devices 230 can be positioned in a same-side rank topology. For example, a first memory device 230-1 and a second memory device 230-2 can be a dual rank pair and can be on a same side, e.g., on a top side, of the PCB 208. Likewise, a third memory device 230-3 and a fourth memory device 230-4 can be on a same side, e.g., on the top side, of the PCB 208. Therefore, when accessing one rank (e.g., a first rank) of each of the dual rank pairs, the memory devices, such as memory devices 230-1, 230-3, toward a first horizontal direction (e.g., a north portion or, put another way, higher up the x-axis, as illustrated) can be accessed concurrently while the memory devices, such as memory devices 230-2, 230-4, of the other rank (e.g., a second rank) of each of the dual rank pairs toward a second horizontal direction (e.g., a south portion or, put another way, lower down the x-axis, as illustrated) can be prevented from being accessed.

Figure 2B:
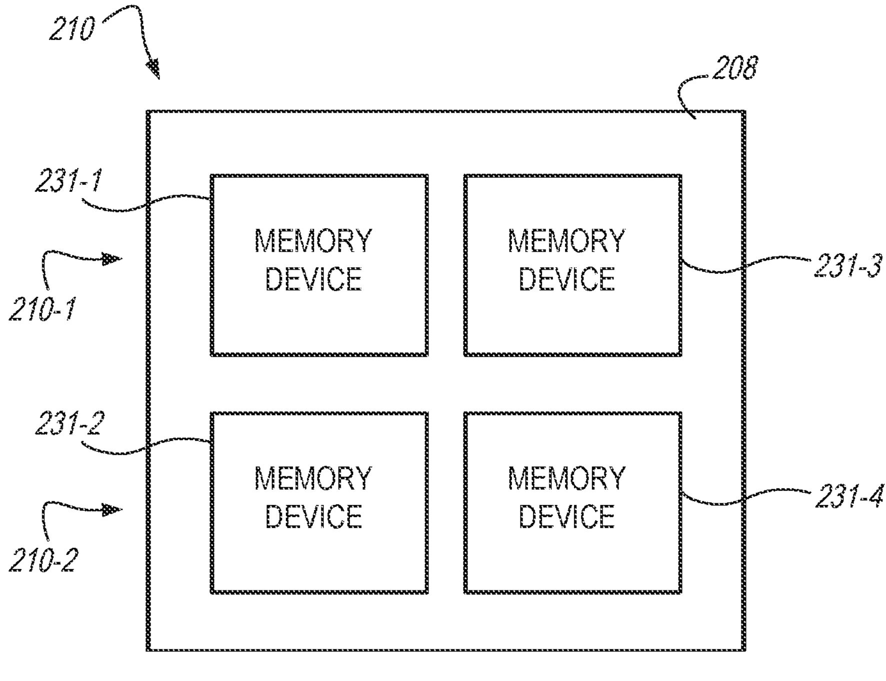
FIG. 2B illustrates an orthogonal bottom view of an example memory sub-system in accordance with some embodiments of the present disclosure.
Figure 2B:
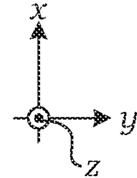

FIG. 2B illustrates an orthogonal bottom side of an example memory sub-system 210 in accordance with some embodiments of the present disclosure. The memory sub-system 210 illustrated in FIG. 2B is the bottom view of the memory sub-system 210 illustrated in FIG. 2A. Accordingly, the view of the memory sub-system 210 shown in FIG. 2B illustrates embodiments in which the components of the memory sub-system 210 are oriented on a printed circuit board (PCB) 208 such that a longest lateral dimension of the PCB 208 extends along the x-axis of FIG. 2B, and shortest lateral dimension of the PCB 208 along the y-axis. The z-axis shown in FIG. 2B extends into and out of the illustration.

As shown in FIG. 2B, the bottom side of the memory sub-system 210 includes a plurality of memory devices 231-1, 231-2, 231-3, 231-4 (referred to hereinafter as plurality of memory devices 231). The components of the memory sub-system 210 (e.g., the plurality of memory devices 231) can be resident on a PCB 208. The memory sub-system 210 can be analogous to the memory sub-system 110 illustrated in FIG. 1. Similarly, the memory sub-system 210 can include a controller, such as controller 115 in FIG. 1, herein.

As mentioned above, the plurality of memory devices 231 can be positioned in a same-side rank topology. For example, a first memory device 231-1 and a second memory device 231-2 can be a dual rank pair and can be on a same side, e.g., on a bottom side, of the PCB 208. Likewise, a third memory device 231-3 and a fourth memory device 231-4 can be on a same side, e.g., on the bottom side, of the PCB 208. Therefore, when accessing one rank (e.g., a first rank) of each of the dual rank pairs, the memory devices, such as memory devices 231-1, 231-3, toward a first horizontal direction (e.g., a north portion or, put another way, higher up the x-axis, as illustrated) can be accessed concurrently while the memory devices, such as memory devices 231-2, 231-4, of the other rank (e.g., a second rank) of each of the dual rank pairs toward a second horizontal direction (e.g., a south portion or, put another way, lower down the x-axis, as illustrated) can be prevented from being accessed.

To further illustrated the point, and in combining the descriptions of FIG. 2A and FIG. 2B, the first-ranked memory devices, e.g., memory devices 230-1 and 230-3 in FIG. 2A and memory devices 231-1 and 231-3 in FIG. 2B, are all on the north portion, or toward the first horizontal direction, of each of the top and bottom sides and are accessed concurrently. While the first-ranked memory devices are accessed concurrently, the second-ranked memory devices, e.g., memory devices 230-2 and 230-4 in FIG. 2A and memory devices 231-2 and 231-4 in FIG. 2B, which are all on the south portion, or toward the second horizontal direction, are not accessed. And vice versa, the second-ranked memory devices are all accessed concurrently while the first-ranked memory devices are not accessed. In this way, a portion of each of the top side and the bottom side are accessed concurrently, in contrast to some previous approaches.

In order to position the memory devices 230, 231 in the same-side rank topology, the memory devices on the south portion may be flipped 180 degrees in order to bring the same package pins as in the north portion of the memory device closer together. For example, in some previous approaches, such as the opposite-side rank topology, the separate rank pairs may be above and below each other, such as memory device 230-1 and 231-1 in FIGS. 2A-2B, where memory device 230-1 is above memory device 231-1. However, when repositioning the separate rank pairs from being above and below each other to the side-by-side topology, the same package pins at a lower portion of a first memory device 230-1 and a lower portion of a second memory device 230-2 may be further away distance-wise. In order to remedy this, the second memory device 230-2 can be flipped 180 degrees in order to bring the lower package pins to an upper position so that the same package pins of memory device 230-1 and 230-2 are located closer to each other.

Figure 3:
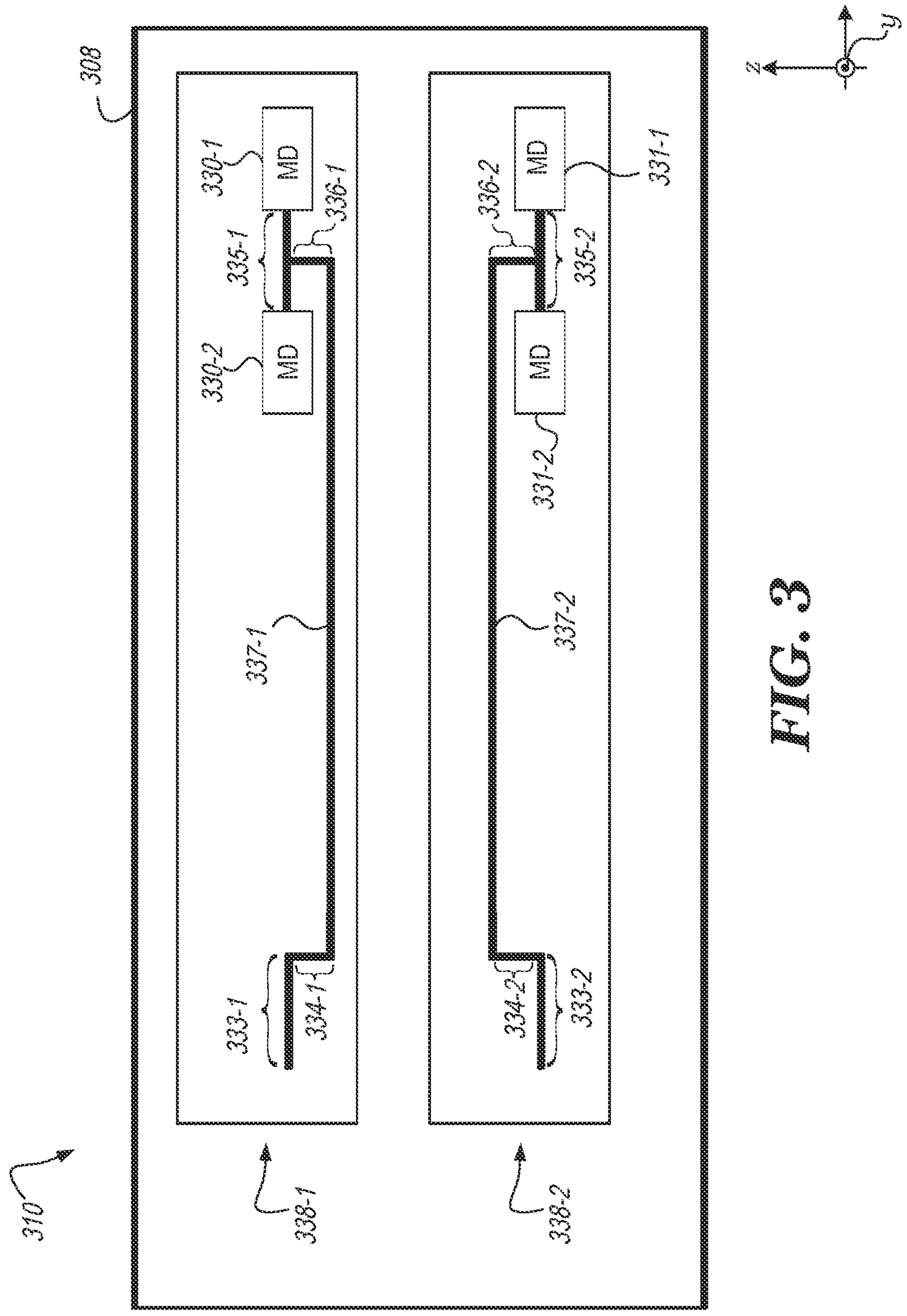
FIG. 3 illustrates an orthogonal side view of an example top and bottom of a memory sub-system in accordance with some embodiments of the present disclosure.

FIG. 3 illustrates an example printed circuit board (PCB) 308 of a memory sub-system 310 showing routing of top side 338-1 and bottom side 338-2 memory devices in accordance with some embodiments of the present disclosure. The memory sub-system 310 illustrated in FIG. 3 is analogous to the memory sub-system 210 illustrated in FIG. 2A and FIG. 2B. The memory sub-system 310 can include a top side 338-1 (analogous to FIG. 2A) and a bottom side 338-2 (analogous to FIG. 2B). The top side 338-1 can include a plurality of memory devices (e.g., DRAMs) 330-1, 330-2 and the bottom side 338-2 can include a plurality of memory devices 331-1, 331-2. The top side 338-1 of FIG. 3 shows the routing of memory devices 338-1, 338-2 located on top of the PCB 308. A top micro-strip 333-1 routes from a top gold-finger (not shown) and connects, through micro-via 334-1, to a nearest strip-line 337-1. This strip-line 337-1 is connected to micro-via 336-1 to reach a top micro-strip 335-1. The micro-strip 335-1 is symmetrically divided to connect to package pins of each of memory device 330-1 and memory device 330-2 located on top of the PCB 308. Similarly, bottom side 338-2 of FIG. 3 shows routing of memory devices located on top of PCB 308. A bottom micro-strip 333-2 routes from a bottom gold-finger (not shown) and connects, through micro-via 334-2, to a nearest strip-line 337-2. This strip-line routing 337-2 is connected to micro-via 336-2 to reach a bottom micro-strip 335-2. This bottom micro-strip 335-2 is symmetrically divided to connect to package pins of each of memory device 331-1 and memory device 331-2 located on the bottom side 338-2 of the PCB 308.

The plurality of memory devices 330-1, 330-2, 331-1, 331-2 can be analogous to the plurality of memory devices 330, 331 illustrated in FIG. 2A and FIG. 2B, herein. The top side 338-1 includes a top micro-strip 333-1 from a top goldfinger (not shown) and the bottom side 338-2 includes a micro-strip 333-2 from a bottom goldfinger (not shown). A goldfinger refers to a row of gold-plated contacts in the upper and lower parts of the PCB 308. It is generally composed of copper, and a gold layer is deposited with a special process, in order to ensure against oxidation and maintain good permeability.

The memory device 330-1 of the top side 338-1 and the memory device 331-1 of the bottom side 338-2 can be in the north portion or toward a first horizontal direction, as was described in association with FIGS. 2A-2B. Further, the memory devices 330-2 of the top side 338-1 and the memory device 331-2 of the bottom side 338-2 can be in the south portion or toward a second horizontal direction, as was described in association with FIGS. 2A-2B.

Figure 4:
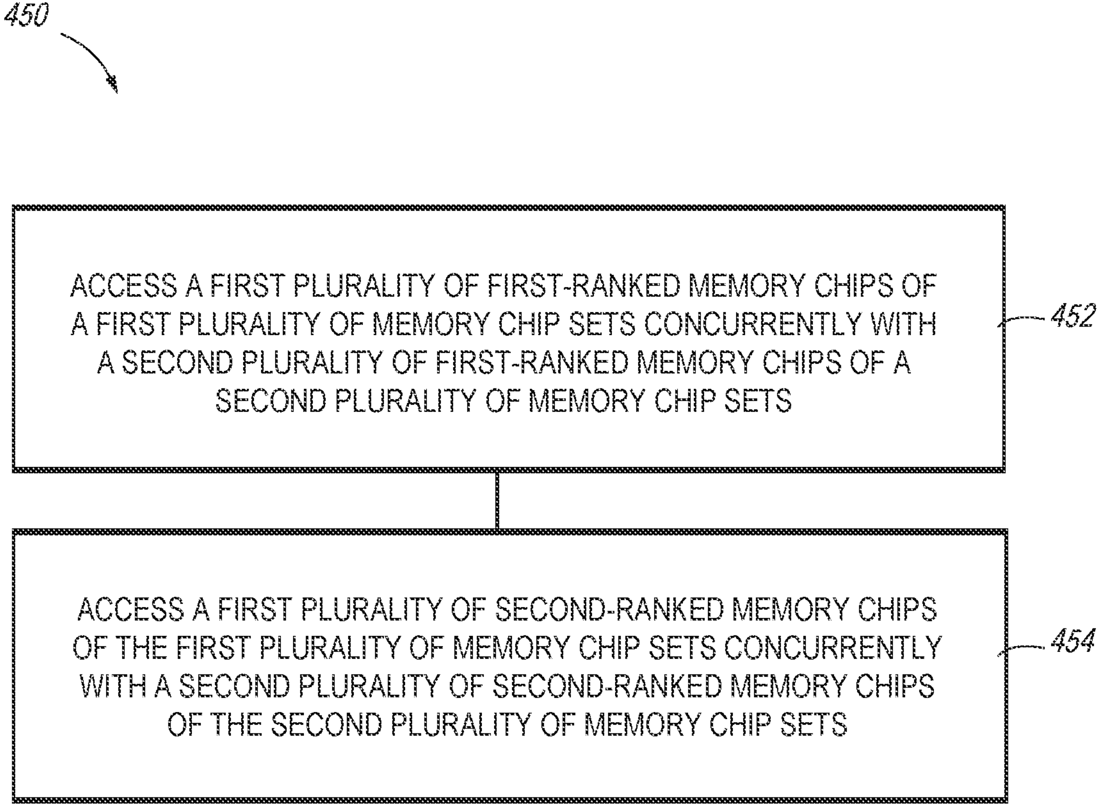
FIG. 4 illustrates an example method associated with using multiple rank DRAMs on a same module side in accordance with some embodiments of the present disclosure.

FIG. 4 illustrates an example method 450 associated with using multiple rank DRAMs on a same module side in accordance with some embodiments of the present disclosure. The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 452, the method 450 can include accessing a first plurality of first-ranked memory chips of a first plurality of memory chip sets concurrently with a second plurality of first-ranked memory chips of a second plurality of memory chip sets. The first plurality of memory chip sets can be in a top layer of a dual-rank dual-inline memory module (DIMM) device. The second plurality of memory chip sets can be in a bottom layer of the dual-rank DIMM device.

At block 454, the method 450 can include accessing a first plurality of second-ranked memory chips of the first plurality of memory chip sets concurrently with a second plurality of second-ranked memory chips of the second plurality of memory chip sets. In some examples, the first plurality of first-ranked memory chips of the first plurality of memory chip sets and the second plurality of first-ranked memory chips of the second plurality of memory chip sets are positioned toward a first horizontal direction of the dual-rank DIMM device. In some examples, the first plurality of second-ranked memory chips of the first plurality of memory chip sets and the second plurality of second-ranked memory chips of the second plurality of memory chip sets are positioned toward a second horizontal direction of the dual-rank DIMM device different than the first horizontal direction.

In some examples, the first plurality of first-ranked memory chips of the first plurality of memory chip sets and the second plurality of second-ranked memory chips of the second plurality of memory chip sets are positioned toward a first horizontal direction of the dual-rank DIMM device. In some examples, the second plurality of first-ranked memory chips of the second plurality of memory chip sets and the first plurality of second-ranked memory chips of the first plurality of memory chip sets are positioned toward a second horizontal direction of the dual-rank DIMM device different than the first horizontal direction. In some examples, the first horizontal direction is different than the second horizontal direction Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:

a dual-rank dual-inline memory module (DIMM) device, comprising a first plurality of dual-rank memory chip sets each comprising a first-ranked memory chip and a second-ranked memory chip and a second plurality of dual-rank memory chip sets each comprising a first-ranked memory chip and a second-ranked memory chip;

wherein:

the first plurality of dual-rank memory chip sets are positioned on a top side of the dual-rank DIMM device;

the second plurality of dual-rank memory chip sets are positioned on a bottom side of the dual-rank DIMM device;

the first-ranked memory chips of the first plurality of dual-rank memory chip sets and the second-ranked memory chips of the second plurality of dual-rank memory chip sets are positioned toward a first horizontal direction of the dual-rank DIMM device; and the first-ranked memory chips of the second plurality of dual-rank memory chip sets and the second-ranked memory chips of the first plurality of dual-rank memory chip sets are positioned toward a second horizontal direction of the dual-rank DIMM device different than the first horizontal direction.

2. The apparatus of claim 1, wherein the first-ranked memory chips of the first plurality of dual-rank memory chip sets on the top side and the first-ranked memory chips of the second plurality of dual-rank memory chip sets on the bottom side are accessed concurrently.

3. The apparatus of claim 1, wherein the second-ranked memory chips of the first plurality of dual-rank memory chip sets on the top side and the second-ranked memory chips of the second plurality of dual-rank memory chip sets on the bottom side are accessed concurrently.

4. An apparatus, comprising:

a dual-rank dual-inline memory module (DIMM) device, comprising:

a top layer comprising:

a first plurality of first-ranked memory chips of a first plurality of memory chip sets; and a first plurality of second-ranked memory chips of the respective first plurality of memory chip sets, wherein each of the first plurality of memory chip sets comprise a pair of one of the first plurality of first-ranked memory chips and one of the first plurality of second-ranked memory chips; and a bottom layer comprising:

a second plurality of first-ranked memory chips of a second plurality of memory chip sets; and a second plurality of second-ranked memory chips of the respective second plurality of memory chip sets, wherein each of the second plurality of memory chip sets comprise a pair of one of the second plurality of first-ranked memory chips and one of the second plurality of second-ranked memory chips, wherein:

each pair of memory chips of each of the first-ranked and the second-ranked memory chips are connected using a micro-strip; and each of the pairs in the first plurality of memory chip sets in the top side is connected to a top goldfinger through a strip line layer nearest a top layer of a printed circuit board (PCB) of the dual-rank DIMM device.

5. The apparatus of claim 4, wherein the plurality of memory chip sets are a plurality of volatile memory devices.

6. The apparatus of claim 5, wherein the plurality of volatile memory devices are dynamic random access memory (DRAM) devices.

7. The apparatus of claim 4, wherein each of the pairs in the first plurality of memory chip sets is connected to the top goldfinger through:

a first microvia that connects each of the pairs to the strip line layer; and a second microvia that connects the strip line layer to the top goldfinger.

8. The apparatus of claim 4, wherein each of the pairs in the second plurality of memory chip sets in the top side is connected to a bottom goldfinger through a strip line layer nearest a bottom layer of a printed circuit board (PCB) of the dual-rank DIMM device.

9. The apparatus of claim 4, wherein:

the first plurality of first-ranked memory chips and the second plurality of first-ranked memory chips are accessed concurrently;

the first plurality of second-ranked memory chips and the second plurality of second-ranked memory chips are accessed concurrently; and the first and second plurality of first-ranked memory chips are not accessed concurrently to the first and second plurality of second-ranked memory chips being accessed.

10. A method, comprising:

accessing a first plurality of first-ranked memory chips of a first plurality of memory chip sets concurrently with a second plurality of first-ranked memory chips of a second plurality of memory chip sets, wherein:

the first plurality of memory chip sets are on a top side of a dual-rank dual-inline memory module (DIMM) device; and the second plurality of memory chip sets are on a bottom side of the dual-rank DIMM device; and accessing a first plurality of second-ranked memory chips of the first plurality of memory chip sets concurrently with a second plurality of second-ranked memory chips of the second plurality of memory chip sets, wherein the first plurality of first-ranked memory chips of the first plurality of memory chip sets and the second plurality of second-ranked memory chips of the second plurality of memory chip sets are positioned toward a first horizontal direction of the dual-rank DIMM device; and the second plurality of first-ranked memory chips of the second plurality of memory chip sets and the first plurality of second-ranked memory chips of the first plurality of memory chip sets are positioned toward a second horizontal direction of the dual-rank DIMM device different than the first horizontal direction.

11. The method of claim 10, wherein:

the first plurality of first-ranked memory chips of the first plurality of memory chip sets and the second plurality of first-ranked memory chips of the second plurality of memory chip sets are positioned toward a first horizontal direction of the dual-rank DIMM device; and the first plurality of second-ranked memory chips of the first plurality of memory chip sets and the second plurality of second-ranked memory chips of the second plurality of memory chip sets are positioned toward a second horizontal direction of the dual-rank DIMM device different than the first horizontal direction.

* * * * *